July 23, 1963 E. C. GREENWOOD 3,098,667
SAFETY JOINT FOR OIL WELL DRILLING STRING
Filed Jan. 26, 1959 2 Sheets-Sheet 1
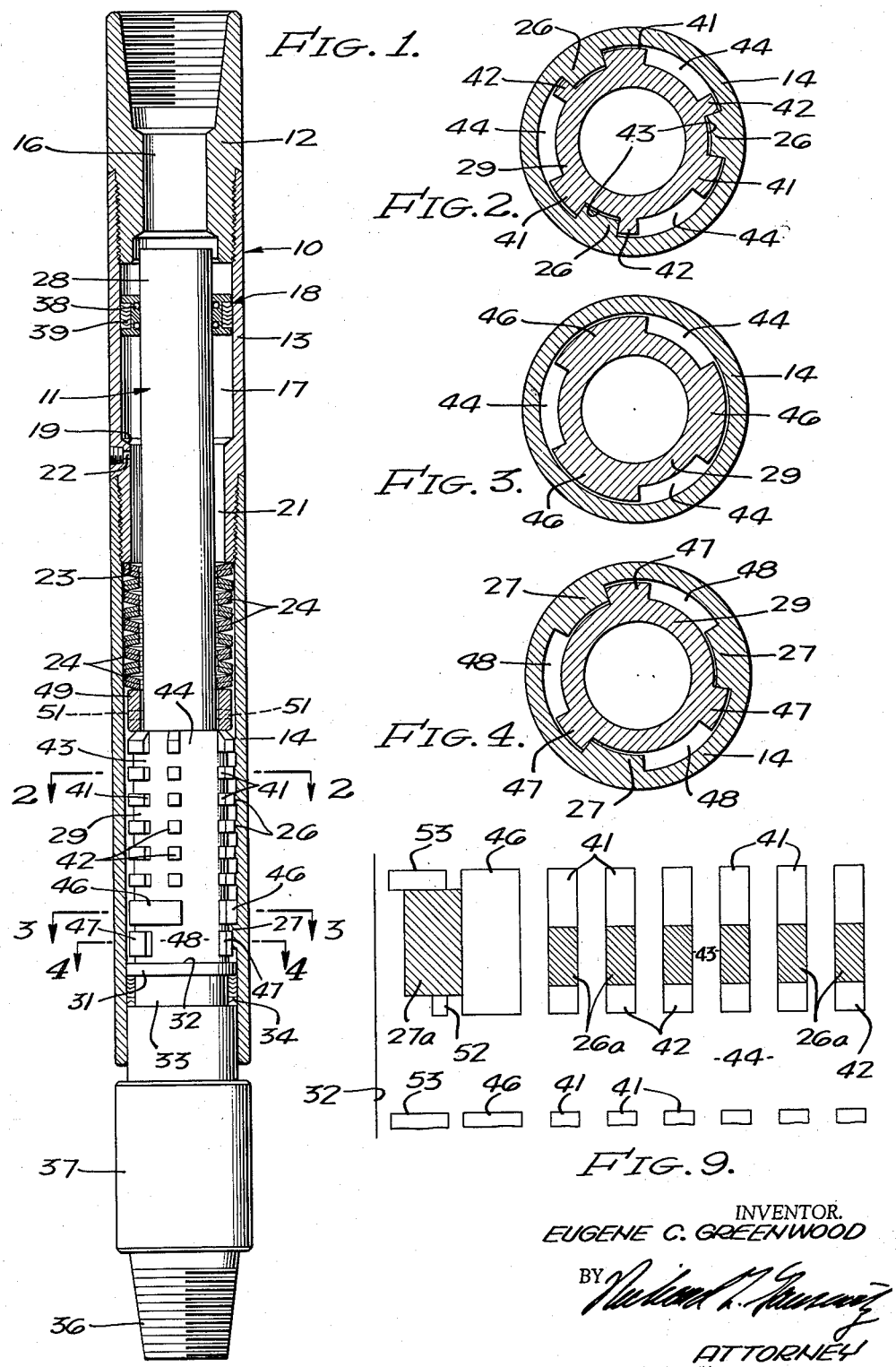
INVENTOR.
EUGENE C. GREENWOOD
BY
ATTORNEY

INVENTOR.
EUGENE C. GREENWOOD
BY
ATTORNEY

United States Patent Office 3,098,667
Patented July 23, 1963

3,098,667
SAFETY JOINT FOR OIL WELL DRILLING STRING
Eugene C. Greenwood, Corona del Mar, Calif.
Filed Jan. 26, 1959, Ser. No. 789,075
15 Claims. (Cl. 285—376)

This invention relates to a releasing tool, and more particularly to a safety joint for connection in the drilling string for an oil well or the like.

Safety joints, for permitting disconnection of the drill bit, collars, etc., from the drilling string in the event that the bit portion becomes irretrievably stuck, conventionally make use of interference threads adapted to separate upon rotation of the string in the reverse direction. Such joints are, however, characterized by a number of disadvantages and defects, one of which is that the interference threads do not always separate before the threads of another joint in the string. When the threads of another joint thus separate, it becomes difficult or impossible to retrieve large amounts of drill pipe which may be present below the separated joint. Furthermore, such joints require a number of revolutions before they will separate, and it may be difficult or impossible to make such revolutions.

Another type of safety joint makes use of a bayonet-like joint, but devices of this nature have also been characterized by a number of disadvantages. Many such joints have heretofore been relatively weak, and subject to opening at an undesired time such as during normal drilling operations. Such undesired opening may result from variations in the axial forces on the joint due to the substantial amount of axial movement of the bit and other components during drilling.

Certain safety joints of the general bayonet type are relatively resistant to unlocking as the result of axial forces, but have the defect of being relatively weak when the string is rotated in the reverse direction. Furthermore, and very importantly, such joints do not have a true bayonet or J-action, but instead require tripping and a relatively complicated series of releasing movements. Also, such joints, if strongly constructed, require a large amount of relative axial movement for locking or releasing, and therefore must be made long and wobbly.

In view of the above and other factors characteristic of conventional safety joints for oil well drilling strings, it is an object of the present invention to provide a greatly improved safety joint which is extremely strong and durable in construction and operation, simple to open and close when desired, positive in locking action.

Another object is to provide a safety joint which is short and compact, requiring very little relative locking or releasing movement, yet is extremely strong and stable.

A further object is to provide a releasing tool in which the barrel and mandrel need only move through a simple J-path relative to each other in order to effect locking or releasing, and which requires no tripping operation.

A further object is to provide a safety joint which is extremely strong, even when the string is rotated in the reverse direction, yet which requires very little relative longitudinal movement during shifting from locked condition to released condition.

A further object is to provide a safety joint which is not subject to opening as a result of axial forces present in the drilling string during normal drilling operations.

A further object is to provide a safety joint which opens and closes as a result of a very small axial and rotational movement, it being impossible to effect disconnection of another joint in the drilling string during reverse rotation carried out for the purpose of opening the safety joint.

These and other objects and advantages of the present invention will be more fully set forth in the following specification and claims, considered in connection with the attached drawings to which they relate.

In the drawings:

FIGURE 1 is a longitudinal view illustrating the safety joint of the invention in locked condition, the barrel and associated components being shown in central section and the mandrel in side elevation;

FIGURE 2 is a transverse section taken on line 2—2 of FIGURE 1, showing the drive keys on the barrel in locked condition in the lock slots between the drive and backup keys on the mandrel;

FIGURE 3 is a section on line 3—3 of FIGURE 1, illustrating the thrust keys on the mandrel and the escape slots therebetween;

FIGURE 4 is a section on line 4—4 of FIGURE 1, illustrating the thrust keys on the barrel and the stop keys on the mandrel;

Figure 5:
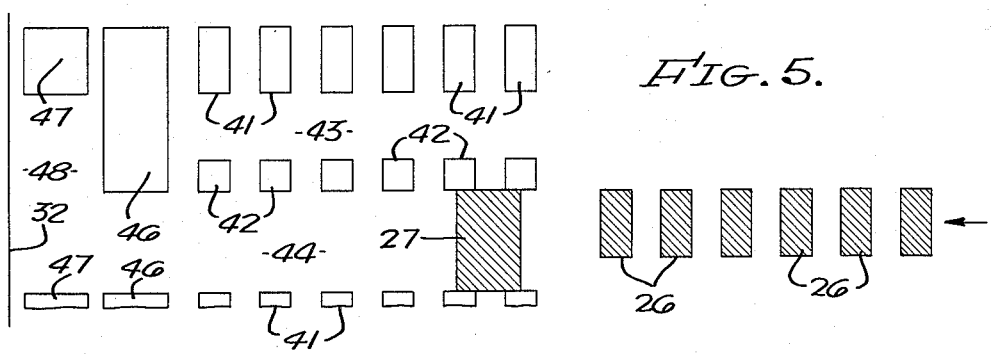
FIGURE 5 is a schematic view in which one set of drive and thrust keys on the barrel is illustrated as entering the escape slot adjacent one set of mandrel keys during closing of the joint, the barrel keys being shaded by hatch lines and the mandrel keys being unshaded.
Figure 6:
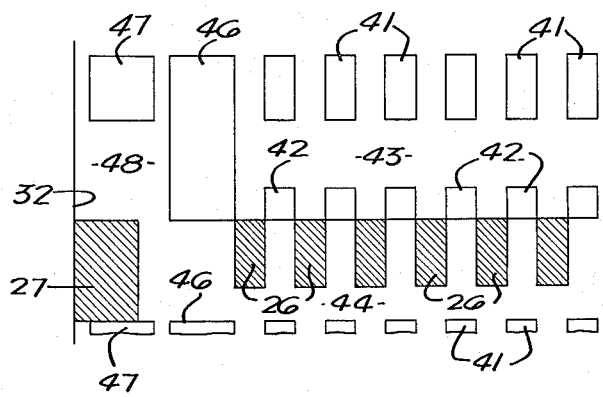
Figure 7:
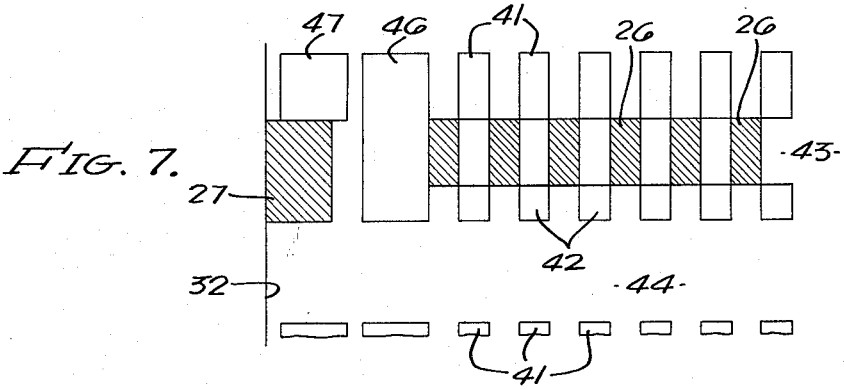
Figure 8:
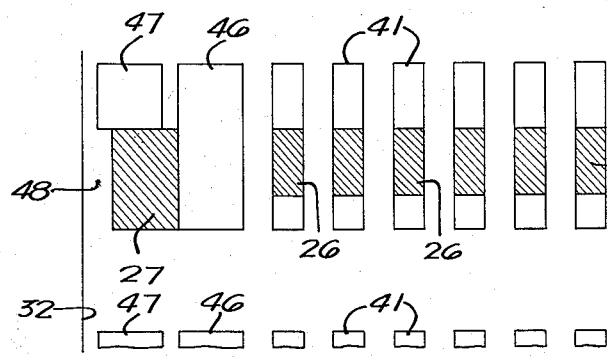

FIGURE 6 corresponds to FIGURE 5 but illustrate the positions of the parts after the thrust key on the barrel has engaged the stop surface on the mandrel;

FIGURE 7 corresponds to FIGURE 6 but shows the positions of the parts after clockwise rotation of the barrel;

FIGURE 8 corresponds to FIGURES 5–7 and shows the locked condition of the joint; and FIGURE 9 illustrates, in schematic form, a second embodiment of the invention.

Referring to the drawings, and particular to FIGURE 1, the safety joint of the invention comprises two elements 10 and 11 which are longitudinally movable relative to each other, each element being adapted to be connected to one portion of a drilling string. More particularly, the element 10 comprises an external or barrel element having a number of connected parts, and the element 11 comprises an internal or mandrel element which is in large part disposed interiorly of the barrel.

Proceeding first to a detailed description of the barrel 10, it may be seen to comprise an upper element 12 which may be termed the top sub, and intermediate element 13 which may be termed the barrel sub, and a lower element 14 which may be termed the drive barrel. Top sub 12 is internally threaded to receive corresponding male threads at the lower end of a section of drill pipe, and is provided with an axial passage or conduit 16 adapted to receive drilling mud from the drill pipe and transmit it downwardly into and through the safety joint.

The barrel sub 13 is internally threaded to fit over corresponding external threads at the lower end of top sub 12, the relationship being such that the exterior cylindrical surfaces of the top sub and barrel sub, as well as the entire barrel 10, are flush and of corresponding diameter. Beneath the top sub 12, barrel sub 13 is provided with a chamber 17 in which a floating packing 18 is disposed. The packing 18 may move along the upper portion of mandrel 11 between the lower end of top sub 12 and a shoulder 19 provided in barrel sub 13 at the lower portion of chamber 17. Barrel sub 13 is formed below chamber 17, and around mandrel 11, with an annulus 21 which communicates with the interior of drive barrel 14. Lubricating fluid is introduced into chamber 17, annulus 21, and drive barrel 14 through a fill plug opening indicated at 22.

The portion of barrel sub 13 outwardly of annulus 21 is reduced in diameter and externally threaded for fitting into an internally threaded upper portion of drive barrel 14. The lower end of such externally threaded portion of barrel sub 13 has an internal diameter which is smaller than the internal diameter of drive barrel 14, resulting in formation of a shoulder 23 which serves as the upper seat for a stack of Belleville or disc springs 24. Formed integrally on the interior wall of drive barrel 14, and spaced below the springs 24, are a plurality of drive keys 26 and thrust keys 27. The shapes, locations and functions of these barrel keys will be described hereinafter, relative to their manner of cooperation with keys on the mandrel 11.

Proceeding next to a description of the mandrel 11, it comprises an upper tubular portion 28 which extends upwardly into a counterbore at the lower end of conduit 16 in top sub 12. Clearance is provided between the upper end of tube 28 and the top sub 12 in order to permit transmission of drilling mud into the portion of chamber 17 above floating packing 18. As previously indicated, the mandrel portion 28 forms the interior wall of annulus 21, and extends through the stack of Belleville springs 24. The portion 28 is integral at its lower end with the drive portion 29 of the mandrel. Drive portion 29, which is also tubular, has a larger diameter than portion 28, and is provided with various keys to be described in detail subsequently.

The lever end of drive portion 29 is formed with an integral flange 31 the upper surface 32 of which forms a radial stop shoulder for the thrust keys 27 of the barrel. Beneath flange 31, the mandrel is provided with an annular channel 33 in which are mounted suitable packer rings 34 preferably formed of elastomeric or plastic material. The packer rings 34 slide on the interior cylindrical surface of drive barrel 14 to provide a seal between the lubricating fluid in the interior of the barrel and the drilling mud at the exterior thereof. The entire chamber between packer rings 34 and floating packing 18 is thus sealed against the entrance of drilling mud.

At the lower end of the mandrel is an externally threaded tool joint pin 36 which may be connected to the drilling bit assembly either directly or through other elements of the drilling string. The lower mandrel end is enlarged at 37 to an external diameter which is the same as that of barrel 10. The entire exterior surface of the safety joint is thus continuous except for a slight gap beneath the lower end of drive barrel 14, which gap permits a slight reciprocation of the barrel relative to the mandrel.

The sliding packing 18 comprises a metal ring or body provided on its interior surface with O-rings 38 to prevent leakage between the body and the exterior surface of mandrel portion 28 along which the packing may slide. The outer cylindrical surface of the metal body is provided with a large annular groove in which are disposed a plurality of packing rings 39, preferably of elastomeric or plastic composition. The position of the sliding packing 18 on mandrel 11 is a function of the depth to which the safety joint is lowered into the well, the diameter of chamber 17, the internal diameter of drive barrel 14 and at packing 34, and other factors.

Before the safety joint is inserted into the well, it is completely filled with lubricant introduced through the fill opening 22, and with the sliding packing 18 in abutment with the lower end of top sub 12. Because of the effects of air trapped in the lubricant chambers, leakage past the various packings, etc., the sliding packing 18 is forced downwardly by hydrostatic pressure after the safety joint is lowered into the well. The position of the packing 18 is accordingly such that the external and internal pressures are always equal, both at the bottom of the well when the packing 18 may be in a low position, and at or near the top of the well when the packing may be in a high position. This pressure-equalizing action has the very desirable effects of preventing stripping of seals, and preventing excessive pressure against the seals which tends to destroy the packing.

The diameter of chamber 17, that is to say the internal diameter of barrel sub 13 at chamber 17, should be equal to the internal diameter of drive barrel 14 at packing 34. This prevents piston action during telescoping of the barrel relative to the mandrel. Stated otherwise, the volume of the chamber between packings 18 and 34 remains constant during reciprocation of the barrel relative to the mandrel, so that there are no fluid pressure variations tending to slide packing 18 along the mandrel. This would not be true if the packings slid along interior cylindrical walls having different diameters. It is pointed out that if these diameters were different, and if the mandrel were reciprocated together with the packings 34 and 18 thereon, one end of the chamber would increase in volume at a greater rate than the other end would decrease in volume. Pressure differentials would therefore occur which would result in shifting of the sliding packing 18 along mandrel 11 as a result of the reciprocation, which action is not desired. It is only desired that the sliding packing move relative to the mandrel 11 when the tool is lowered into the well or raised therefrom.

*Detailed Description of the Mandrel and Barrel Keys, and Associated Elements*

Throughout this specification and claims, for purposes of simplicity of description, the faces of the various keys lying in planes perpendicular to the axis of the tool will be referred to as the "ends" of the keys. The "sides" of the keys, on the other hand, lie in radial planes which contain the tool axis. It is to be understood, however, that this is by way of definition only and not by way of limitation, since machining and other considerations may make it feasible or desirable to place the key sides in planes which are not strictly radial, and the key ends in planes which are not strictly perpendicular to the tool axis.

The previously-indicated drive keys 26 on the interior surface of barrel drive portion 14 are provided in three axially extending and corresponding rows which are spaced equally about the circumference of the tool. In the present embodiment, each row has six keys 26, as shown in FIGURES 5–8. Spaced below the lower end of each row of drive keys 26 of the barrel is a thrust key 27, such key being of substantially larger size than each drive key both in longitudinal and transverse dimensions. The sides of the drive keys 26 in each row are in axial alignment, and the leading side of each drive key 26 is also in axial alignment with the leading side of the corresponding thrust key 27. This provides an important guiding action to be indicated hereinafter.

The drive portion 29 of the mandrel is formed with three axial rows of drive keys and three rows of backup keys, numbered 41 and 42, respectively, which are spaced in alternation about the circumference of the mandrel. A backup key 42 is offset circumferentially from each drive key 41 and in a direction opposite to the normal direction of rotation of the tool. The backup keys 42 may be of smaller size than the drive keys of the mandrel and barrel, although it is important that they be strong in order to insure against breaking of the joint during reverse rotation of the drill string.

A longitudinal groove 43, which may be termed a lock groove, is provided between each row of drive keys 41 and the corresponding row of backup keys 42. A longitudinal groove 44, which may be termed an escape groove, is formed on the side of each row of backup keys 42 which is behind the backup keys when the tool is rotating in the normal direction. Each escape groove 44 is substantially wider than each lock groove 43, being of sufficient transverse dimension that the thrust keys 27 of the barrel may move therealong as indicated schematically in FIGURES 5 and 6.

A thrust key 46 is provided on the mandrel in spaced relation below the lower ends of the corresponding rows of drive keys 41 and thrust keys 42. Each thrust key has its sides in longitudinal or axial alignment with the side surfaces of the drive keys 41 and backup keys 42 (in each set of rows thereof) which are remote from each other.

A stop key 47 is formed on the mandrel below each thrust key 46. The width of each such stop key 47 is substantially less than the width of the associated thrust key 46, forming a transverse passage 48 through which the thrust key 27 of the barrel may move when the barrel is rotated in the normal direction (clockwise, as viewed from above) relative to the mandrel.

As indicated in FIGURE 7, the sides of thrust keys 27 of the barrel and stop keys 47 of the mandrel come into engagement when the drive keys 26 of the barrel are disposed in lock grooves 43. The opposite side surfaces of the stop keys 47, that is to say the advance surfaces when the tool is rotating in the normal direction, are in longitudinal alignment with the advance sides of thrust keys 46 of the mandrel, and also with the advance sides of drive keys 41 of the mandrel.

As previously indicated, the escape grooves 44 are made sufficiently wide to receive the thrust keys 27 of the barrel, so that such thrust keys may move downwardly through the grooves 44 to come into engagement with stop shoulder 32. This is illustrated in FIGURES 5 and 6. It is emphasized that the thrust keys 27 are spaced a sufficient distance below the corresponding drive keys 26 that the lower end of thrust keys 27 engage stop shoulder 32 the same instant that drive keys 26 become transversely registered with the gaps or spaces between backup keys 42 (FIGURE 6). Before the FIGURE 6 position is reached, it is not possible to rotate the barrel in either direction relative to the mandrel, since such rotation is prevented by the various key sides. Thus, it is pointed out that even when the thrust keys 27 of the barrel are completely below the thrust keys 46 of the mandrel, but not yet in engagement with stop shoulder 32, rotation of the barrel relative to the mandrel is nevertheless prevented since the leading sides of drive keys 26 are in engagement with the trailing sides of backup keys 42, and since the trailing sides of the thrust keys 27 of the barrel are in engagement with the leading sides of the stop keys 47.

As soon as the lower ends of the thrust keys 27 of the barrel engage stop shoulder 32, it becomes possible to rotate the barrel clockwise relative to the mandrel, as viewed from above, until such thrust keys enter passages 48 and engage stop keys 47, as shown in FIGURE 7. Such rotation is permitted since the lengths of the drive keys 26 of the barrel are made slightly less than the spacings between the backup keys 42, respectively. The same applies to the spacing between the upper end of thrust key 46 of the mandrel and the lower end of the adjacent backup key 42, in each instance.

After reaching the position shown in FIGURE 7, the thrust keys 27 and drive keys 26 of the barrel are shifted upwardly, due to the raising of the drill string and to the action of springs 24 as will be described below, to the position shown in FIGURE 8. The drive keys 26 of the barrel are then locked between the drive keys 41 and backup keys 42 of the mandrel. Such positioning of the drive keys 26 is possible because the lock grooves 43 are, in each instance, slightly wider than the widths of drive keys 26 of the barrel.

Proceeding next to a detailed description of the Belleville springs 24 and associated components, these are seated on an adjustment ring 49 which is mounted around mandrel portion 28 and is preferably provided with ports 51 in order to assure flow of lubricant therearound. Ring 49 seats at its lower edge on the uppermost drive and backup keys 41 and 42 of the mandrel. These upper mandrel keys are preferably tapered upwardly, as indicated in FIGURE 1. The longitudinal dimension of the ring 49 is a function of the number of springs 24 which is desired to employ, and the exact manner in which it is desired to use the tool.

It is to be understood that the springs 24 provide a very large longitudinal force, for example on the order of twenty tons. Thus, the springs 24, in acting upwardly against the barrel shoulder 23, provide a very great force tending to shift the barrel keys upwardly from the position shown in FIGURE 7 to that shown in FIGURE 8. Such force is so great that it assures that the safety joint will remain in the locked position, FIGURE 8, at all times during normal drilling, despite longitudinal movement of the lower portion of the drilling string caused by the drilling action. The joint will therefore not open until after the drilling operators deliberately cause the barrel 10 to be shifted downwardly by impressing thereon a force greater than the opposing force of the springs 24.

The force exerted by the springs 24 is borne by the engaged end surfaces of the thrust keys 27 and 46. Such keys are sufficiently large and strong that they greatly exceed the strength of the drill pipe sections. The result is that any failure of the drilling string due to tensile forces will not occur in the safety joint, but instead in the drill pipe itself. Correspondingly, the shear areas of the drive keys 41 and 26 is greater than the shear area of any drill pipe section, so that any shear failure will occur in the drill pipe instead of in the safety joint. The extremely strong construction of the safety joint is an important feature of the invention.

It is emphasized that there is only a very short travel of the barrel between the position shown in FIGURE 7 and that shown in FIGURE 8. It follows that the longitudinal force exerted by the springs is still very great when the parts are in locked condition, FIGURE 8. Because of the key construction of the invention, this heavy spring pressure when in locked condition is achieved without sacrificing great strength to withstand rotational forces in both normal and reverse directions.

As an illustration of one embodiment of the safety joint of the invention, each drive key 41 may occupy 31 degrees, each lock groove 43 may occupy 32 degrees, each backup key 42 may occupy 12 degrees, and each escape groove 44 may occupy 45 degrees. Each mandrel thrust key 46 may occupy 75 degrees, and each stop key 47 may occupy 31 degrees. Each transverse passage 48 occupies 44 degrees.

The drive keys 26 of the barrel may each occupy 31 degrees, being separated by spaces of 89 degrees in each instance. The thrust keys 27 of the barrel may each occupy 44 degrees, and may be separated by spaces of 76 degrees in each instance.

*Summary Of Operation Of The Embodiment Of FIGURES 1–8*

The oil well tool is first assembled at the factory or shop, and is filled with lubricant in the manner previously stated. Such assembly is made by rotating the barrel relative to the mandrel until the thrust keys 27 of the barrel are registered with escape grooves 44 as shown in FIGURE 5. The barrel and mandrel are then moved longitudinally relative to each other until the thrust keys 27 engage shoulder 32 (FIGURE 6) of the mandrel. While the thrust keys 27 are still spaced away from the shoulder, the Belleville springs 24 begin to compress, so that the remainder of the longitudinal travel must be effected by means of a heavy press acting against opposite ends of the tool. The number of springs 24, the size of the ring 49, etc., should be so adjusted that the springs begin to compress substantially before the upper ends of keys 27 reach the lower ends of keys 46.

As previously stated, no relative rotation may be effected between the barrel and the mandrel until the lower ends of thrust keys 27 engage stop surface 32, at which time the barrel may be rotated clockwise (as viewed from above) to the position shown in FIGURE 7. Thereafter, the pressure of the press is released to permit the springs to shift the barrel in a reverse direction, until the keys are in the locked condition shown in FIGURE 8. Such reverse travel is short, as previously stated, so that the spring pressure will remain high.

The tool is then conected in a drilling string, normally at the top of the drill collars, about 100 feet above the drill bit assembly. The tool transmits torque from the string sections above the tool to the string sections therebeneath, by virtue of the engagement between drive keys 26 and 41. As above explained, the tool is positively locked despite the effects of longitudinal forces normally present during drilling. Upon rotation of the string in the reverse direction, the rotational driving force is transmitted from keys 26 to backup keys 42, the latter keys being (in the aggregate) very strong although normally not so strong as the keys 41.

The tool is always operated in locked condition, until the drill bit assembly or associated parts become stuck. In such event, it is merely necessary for the drilling operators to lower the drilling string until the weight thereof at the safety joint becomes sufficient to overcome the pressure of springs 24 and cause downward shifting of the barrel until thrust keys 27 again engage shoulder 32. After such engagement, the barrel is rotated in the reverse direction, or counterclockwise as viewed from above, until the thrust keys 27 enter escape grooves 44 and engage stop keys 47 as shown in FIGURE 6. The drilling string is then merely lifted while the keys 27 and 26 move upwardly through escape grooves 44. It is thus possible to retrieve the barrel along with all of the components of the drilling string above the safety joint. Furthermore, the springs 24 and ring 49 are retrieved due to the action of the barrel keys as they move upwardly. The floating packer 18 is also carried upwardly due to the action of shoulder 19.

It is to be understood that the drilling string is normally in tension except for a small region relatively adjacent the bit. Thus, the weight of the drilling string above the safety joint is not normally impressed on the safety joint until such time as the drilling string is lowered to effect the unlocking action described above.

*Embodiment of FIGURE 9*

The embodiment shown in FIGURE 9 is identical to the one previously described, and has been given corresponding reference numerals, except that in this instance the leading sides of drive keys 26a of the barrel are not aligned with the leading sides of thrust keys 27a thereof. It follows that the forward or leading sides of the barrel drive keys 26a do not operate to prevent rotation of the barrel relative to the mandrel, until thrust keys 27a engage shoulder 32, as they did in connection with the first embodiment. Such rotation is instead prevented, until the thrust keys 27a engage shoulder 32, by additional guide keys 52 disposed on the mandrel beneath the trailing sides of thrust keys 46. Furthermore, the stop keys 53 of the mandrel are made substantially narrower than in the case of the first embodiment, in order to permit rotation of the barrel until the drive keys 26a of the barrel are in lock grooves 43 as indicated. This allows the thrust key to be made larger and therefore stronger.

Various embodiments of the present invention, in addition to what has been illustrated and described in detail, may be employed without departing from the scope of the accompanying claims.

I claim:

1. A releasing tool, which comprises a pair of parallel elongated elements capable of movement both longitudinally and rotationally relative to each other when in predetermined positions relative to each other, a plurality of individual keys provided on one of said elements in alignment longitudinally of said one element and spaced from each other longitudinally thereof, a plurality of individual keys provided on the other of said elements in alignment longitudinally of said other element and spaced from each other longitudinally thereof, the dimension of each of said last-mentioned keys longitudinally of said other element being less than the corresponding space between each pair of adjacent keys on said one element, the spaces between said keys on said one element corresponding to the positions of said keys on said other element whereby said keys on said other element may move between said keys on said one element during rotation of said one element and other element relative to each other when said elements are in predetermined longitudinal positions relative to each other, means provided on said one element to stop the relative rotational movement of said other element when said keys on said other element have rotated past said keys on said one element and may therefore shift longitudinally relative to said one element to lock positions at which said keys on said elements are circumferentially adjacent each other, spring means connected between said one element and said other element to shift said elements longitudinally relative to each other until said key elements are in said circumferentially adjacent lock positions, thrust means to prevent shifting of said elements relative to each other past said lock positions at which said keys are circumferentially adjacent each other despite the continued bias of said spring means, and stop means to limit the longitudinal movement of said one element and other element relative to each other when said elements are in said predetermined longitudinal positions relative to each other.

2. An elongated release tool adapted to rotate about its longitudinal axis and to transmit torque from one end of the tool to the other end thereof, which comprises two elements adapted to telescope relative to each other and to move both longitudinally and rotationally relative to each other except when in locked condition, a row of keys provided on one of said elements in spaced relationship longitudinally of said one element, key means provided on said one element in axially extending relationship and spaced circumferentially from said row of keys to provide a first groove therebetween, means to define a second groove extending longitudinally of said one element and on the other side of said row of keys from said first groove, a row of keys provided on said other element in spaced relationship longitudinally of said other element and sufficiently small to fit into said first groove between the respective keys on said one element and said key means, said keys on said other element being so spaced and having such dimensions longitudinally of said other element to permit shifting thereof between said keys on said one element during relative rotation between said one element and other element when said elements are in predetermined longitudinal positions relative to each other, spring means connected between said elements to effect longitudinal shifting of said other element relative to said one element, means to effect compression of said spring means during longitudinal shifting of said elements relative to each other to achieve said predetermined relative longitudinal position at which said keys of said other element may rotate between the keys of said one element into said first groove, stop means to stop said last-mentioned longitudinal shifting when said elements are in said predetermined relative longitudinal positions, and means to prevent longitudinal shifting of said one element and other element relative to each other, after rotation of said keys of said other element into said first groove, except through a distance sufficient to cause said keys of said other element to be in locked condition circumferentially between said keys of said one element and said key means of said one element.

3. The invention as claimed in claim 2, in which said last-named means comprises a relatively large thrust key provided on said other element and spaced from and generally aligned with the end key of said row of keys of said other element, and a cooperating thrust key provided on said one element and spaced from and generally aligned with the end key of said rows of keys of said other element, and a cooperating thrust key provided on said one element and spaced from and generally aligned with the corresponding end one of said row of keys of said one element.

4. An elongated tool adapted to rotate about its longitudinal axis and to transmit torque from one end thereof to the other end thereof, which comprises two elements telescoped relative to each other and movable longitudinally and rotationally relative to each other except when in locked condition, means to define on the surface of one of said elements a longitudinal escape groove and a longitudinal lock groove circumferentially offset from each other, said means to define said escape groove and lock groove including a row of keys rigidly provided on said one element in alignment longitudinally of the tool and spaced from each other, and also including key means circumferentially offset from said row of keys and extending longitudinally of the tool, a row of keys provided on said other element and spaced longitudinally of the tool, said keys on said other element being adapted to rotate between said keys on said one element from said escape groove to said lock groove when said one element and said other element are in a predetermined longitudinal position relative to each other, stop means to stop the relative longitudinal movement of said one element and other element when said predetermined longitudinal position is achieved, Belleville spring means interposed between said one element and said other element to resist longitudinal shifting of said one element relative to said other element as said predetermined longitudinal position is approached whereby the spring pressure resisting such relative longitudinal shifting is maximum when said predetermined longitudinal position is achieved, stop means to stop the rotational movement of said one element and other element relative to each other when said row of keys on said other element has been rotated into Belleville spring means interposed between said one said lock groove, and thrust means to limit longitudinal shifting of said one element and other element relative to each other and away from said predetermined position to a second predetermined longitudinal position at which said keys of said other element are disposed in said lock groove in locked condition between said keys of said one element and said key means of said one element, said last-named means being adapted to limit said longitudinal shifting under the pressure of said Belleville spring means to a relatively small amount whereby large spring pressure is effected by said Belleville spring means when said elements are in said second predetermined position.

5. The invention as claimed in claim 4, in which means are provided to prevent rotational movement of said one element and other element relative to each other except when in said first-mentioned predetermined longitudinal position at which the pressure exerted by said Belleville spring means is at a maximum, said means comprising side surfaces of said keys on said one element and said keys on said other element.

6. A safety joint for connection in an oil well drilling string, which comprises an elongated, generally tubular barrel adapted to be connected to one portion of the drilling string, an elongated mandrel adapted to be connected to another portion thereof and to telescope inside of said barrel, said mandrel having a drive portion the outer surface of which is spaced radially inwardly from the interior surface of a drive portion of said barrel, a plurality of longitudinal rows of backup keys provided on said surface of said drive portion of said mandrel in circumferentially spaced relationship, each of said rows comprising a substantial number of backup keys spaced from each other to provide gaps therebetween, longitudinally extending drive key means provided on said surface of said drive portion of said mandrel between each of said rows of backup keys and in circumferentially spaced relationship therefrom, said backup keys and drive key means defining on opposite sides of each row of backup keys an escape groove and a lock groove each extending longitudinally of the tool, each lock groove being located in advance of the adjacent row of backup keys during normal rotation of the tool and each escape groove being disposed to the rear of the adjacent row of backup keys during normal rotation of the tool, a plurality of rows of drive keys provided on said interior barrel surface in circumferentially offset relationship corresponding to the spacing between said escape grooves of said mandrel whereby said barrel drive keys may move longitudinally in said mandrel escape grooves, each of said rows of drive keys of said barrel extending longitudinally of the tool and including a plurality of longitudinally spaced keys which are so spaced as to permit rotation thereof between said backup keys when said mandrel and barrel are in a predetermined longitudinal position relative to each other, a stack of Belleville springs seated between said mandrel and barrel and adapted to be compressed and resist longitudinal movement of said barrel relative to said mandrel as said predetermined longitudinal position is approached, said Belleville springs operating to shift said barrel away from said predetermined position after rotation of said barrel drive keys between said backup keys into said lock grooves, thrust means to stop longitudinal movement of said barrel drive keys in said lock grooves due to the action of said springs when said barrel drive keys are locked between said mandrel backup keys and said key means of said mandrel, said thrust means, said Belleville springs and said keys being so related that said Belleville springs exert a large force when said barrel keys are locked between said mandrel backup keys and said key means on said mandrel, and stop means provided on said mandrel to stop longitudinal movement of said mandrel and barrel in a direction relative to each other which effects additional compression of said Belleville springs and when said mandrel and barrel are in said predetermined longitudinal position relative to each other.

7. A safety joint for connection in an oil well drilling string, which comprises an elongated, generally tubular barrel adapted to be connected to one portion of the drilling string, an elongated mandrel adapted to be connected to another portion thereof and to telescope inside of said barrel, said mandrel having a drive portion the outer surface of which is spaced radially inwardly from the interior surface of a drive portion of said barrel, a plurality of longitudinal rows of backup keys provided on said surface of said drive portion of said mandrel in circumferentially spaced relationship, each of said rows comprising a substantial number of backup keys spaced from each other to provide gaps therebetween, longitudinally extending drive key means provided on said surface of said drive portion of said mandrel between each of said rows of backup keys and in circumferentially spaced relationship therefrom, said backup keys and drive key means defining on opposite sides of each row of backup keys an escape groove and a lock groove each extending longitudinally of the tool, each lock groove being located in advance of the adjacent row of backup keys during normal rotation of the tool and each escape groove being disposed to the rear of the adjacent row of backup keys during normal rotation of the tool, a plurality of rows of drive keys provided on said interior barrel surface in circumferentially offset relationship corresponding to the spacing between said escape grooves of said mandrel whereby said barrel drive keys may move longitudinally in said mandrel escape grooves, each of said rows of drive keys of said barrel extending longitudinally of the tool and including a plurality of longitudinally spaced keys which are so spaced as to permit rotation thereof between said backup keys when said mandrel and barrel are in a predetermined longitudinal position, a stack of Belleville springs seated between said mandrel and barrel and adapted to resist longitudinal movement of said barrel relative to said mandrel as said predetermined longitudinal position is approached, said Belleville springs operating to shift said barrel away from said predetermined position after rotation of said barrel drive keys between said backup keys into said lock grooves, a relatively large thrust key provided on said mandrel below each row of backup keys, a relatively large thrust key provided in said barrel below each row of drive keys thereon, each thrust key on said barrel being spaced sufficiently far from the corresponding row of barrel drive keys that it rotates beneath said thrust key of said mandrel during rotation of said barrel drive keys from said escape grooves into said lock grooves, a radial stop shoulder formed on said mandrel for engagement by said thrust keys on said barrel when said mandrel and barrel are in said predetermined longitudinal position to thus limit longitudinal movement of said barrel relative to said mandrel, said thrust keys on said barrel and said thrust keys on said mandrel being so related as to be in engagement upon shifting of said barrel away from said predetermined longitudinal position relative to said mandrel due to the action of said Belleville springs and until said barrel drive keys are locked in said lock grooves between said backup keys of said mandrel and said key means thereof, said shifting of said barrel between said predetermined longitudinal position relative to said mandrel and said last-mentioned position at which said barrel thrust keys engage said mandrel thrust keys being sufficiently small that said Belleville springs continue to exert large pressure when said thrust keys are in engagement, thereby assuring maintenance of the joint in locked condition despite longitudinal forces present in the drilling string during normal drilling operations.

8. The invention as claimed in claim 7, in which sides of said barrel thrust keys and barrel drive keys are so related to sides of said mandrel backup keys and thrust keys that rotation of said barrel relative to said mandrel is prevented until said barrel and mandrel are in said predetermined longitudinal position at which the spring pressure is a maximum, and in which stop means are provided to limit the rotation of said barrel relative to said mandrel when in said predetermined longitudinal position to an angle effecting shifting of said barrel drive keys from said escape grooves into said lock grooves.

9. The invention as claimed in claim 7, in which a guide key is provided on said mandrel below each thrust key thereof to prevent rotation of said barrel relative to said mandrel until said predetermined longitudinal position is achieved.

10. The invention as claimed in claim 7, in which sealing means are provided to define a sealed chamber inside of said barrel between the upper portion of said mandrel and the lower portion thereof, said chamber being adapted to be filled with lubricating fluid to assure lubrication of said keys and other cooperating surfaces at all times.

11. The invention as claimed in claim 10, in which said sealing means include a floating packing ring movable longitudinally along a portion of said mandrel and in a chamber defined by said barrel, said floating packing compensating for the effects of hydrostatic pressure as said safety joint as moved into and out of the well.

12. The invention as claimed in claim 7, in which the seats for said stack of Belleville springs include an adjustment ring interposed between one end of said stack of springs and one of said mandrel and barrel elements, whereby selection of adjustment rings of various longitudinal dimensions permits alteration in the characteristics and number of the springs in said stack.

13. A safety joint for connection in an oil well drilling string, which comprises a generally tubular barrel adapted to be connected to one portion of said string, an elongated mandrel adapted to be connected to another portion thereof and telescoped inside of said barrel, said mandrel also being generally tubular and adapted to transmit drilling mud through the joint, means to define a sealed lubricant chamber inside of said barrel around said mandrel in order to maintain the lubricant separate from said drilling mud, a stack of Belleville springs mounted around said mandrel in said lubricant chamber and seated at one end on said barrel and at the other end on said mandrel, a stop shoulder provided on said mandrel at the lower end thereof and in said chamber, a plurality of relatively large thrust keys provided in said chamber on said barrel and adapted to engage said stop shoulder when said barrel and mandrel are in a predetermined relative longitudinal position and after compression of said stack of Belleville springs to a maximum amount, said barrel thrust keys being circumferentially offset relative to each other, a plurality of rows of backup keys provided on said mandrel in circumferentially offset relationship and each comprising a substantial number of individual keys disposed in alignment longitudinally of the tool and spaced from each other, a plurality of rows of drive keys provided on said mandrel in circumferentially offset relationship between said rows of said backup keys and each comprising a plurality of individual drive keys aligned longitudinally of the tool and spaced from each other, a thrust key provided on said mandrel below each row of said backup keys and an adjacent row of said mandrel drive keys, each row of backup keys and an adjacent row of mandrel drive keys defining between them at points circumferentially offset from the associated mandrel thrust keys escape grooves extending clear to said stop shoulder, a stop key provided on said mandrel between each mandrel thrust key and said stop shoulder and generally aligned with the associated row of mandrel drive keys and offset from the associated row of mandrel backup keys to provide a transverse passage between each mandrel thrust key and said stop shoulder, a plurality of rows of spaced drive keys provided on said barrel and longitudinally thereof, each of said rows or barrel drive keys being aligned with a barrel thrust key, means to prevent rotation of said barrel relative to said mandrel until said barrel thrust keys are in engagement with said stop shoulder, the longitudinal spacings between said barrel thrust keys and barrel drive keys being such that said barrel drive keys are registered, when said barrel thrust keys are in engagement with said shoulder, with the gaps between said mandrel backup keys, the upper ends of said barrel thrust keys being spaced below the lower ends of said mandrel thrust keys, when said barrel thrust keys are in engagement with said shoulder, a distance corresponding generally to the longitudinal dimension of each backup key, the positions of said stop keys being such that after engagement of said barrel thrust keys therewith due to rotation of said barrel relative to said mandrel when said barrel thrust keys are in engagement with said stop shoulder the barrel drive keys are in longitudinal lock grooves, said lock grooves being formed between said mandrel drive keys and backup keys and aligned above the respective mandrel thrust keys, whereby said Belleville springs may shift said barrel relative to said mandrel until said barrel drive keys are locked in said lock grooves circumferentially between said backup keys and mandrel drive keys, at which time said upper ends of said barrel thrust keys bear against the lower ends of said mandrel thrust keys under heavy spring pressure from said Belleville springs.

14. The invention as claimed in claim 13, in which the leading sides of said barrel thrust keys are respectively aligned with the leading sides of said barrel drive keys of the corresponding rows, and cooperate with the backup keys and thrust keys of said mandrel to form said means for preventing rotation of said barrel relative to said mandrel until said barrel thrust keys engage said stop shoulder.

15. The invention as claimed in claim 13, in which said means to prevent rotation of said barrel relative to said mandrel until said barrel thrust keys engage said stop shoulder include guide keys provided on said mandrel below said mandrel thrust keys and spaced above said stop shoulder a distance sufficient to permit rotational shifting of said barrel thrust keys therebeneath when said barrel thrust keys are in engagement with said stop shoulder.

References Cited in the file of this patent

UNITED STATES PATENTS

| | | |
|---|---|---|
| 2,008,743 | Black | July 23, 1935 |
| 2,049,290 | Burns et al. | July 28, 1936 |
| 2,065,262 | Barkelew et al. | Dec. 22, 1936 |
| 2,610,027 | Waggener | Sept. 9, 1952 |
| 2,819,878 | Beck | Jan. 14, 1958 |
| 2,919,900 | Segelhorst | Jan. 5, 1960 |

FOREIGN PATENTS

| | | |
|---|---|---|
| 899,137 | Germany | Dec. 7, 1953 |